Aug. 22, 1944.    W. B. POYNTER    2,356,178
LIGHT CONTROL DEVICE
Filed Oct. 23, 1940    6 Sheets-Sheet 1
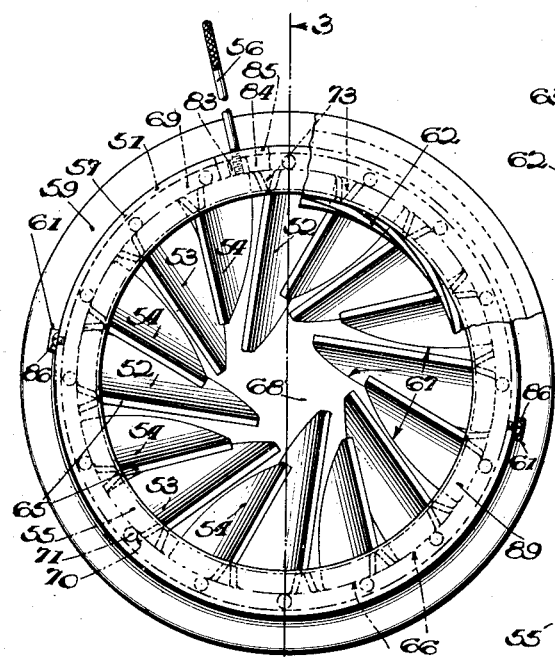
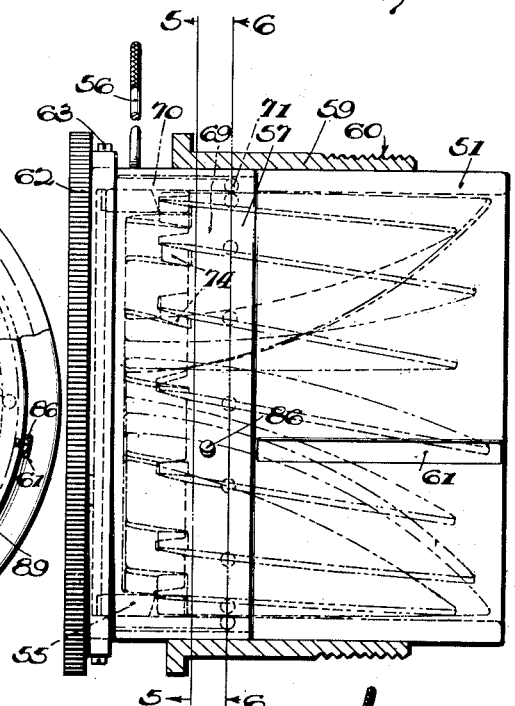
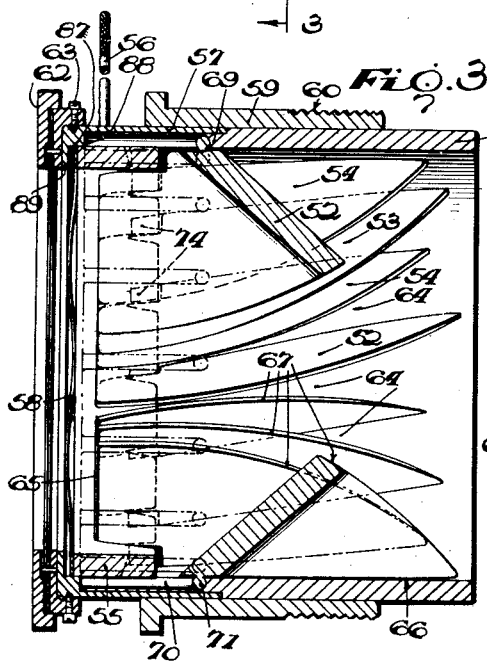
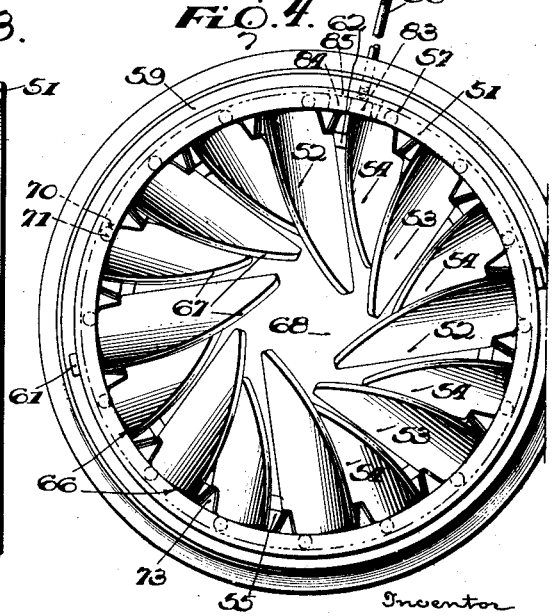
Inventor
By William B. Poynter
Cameron, Kerkam + Sutton
Attorneys Aug. 22, 1944.  W. B. POYNTER  2,356,178
LIGHT CONTROL DEVICE
Filed Oct. 23, 1940  6 Sheets-Sheet 2
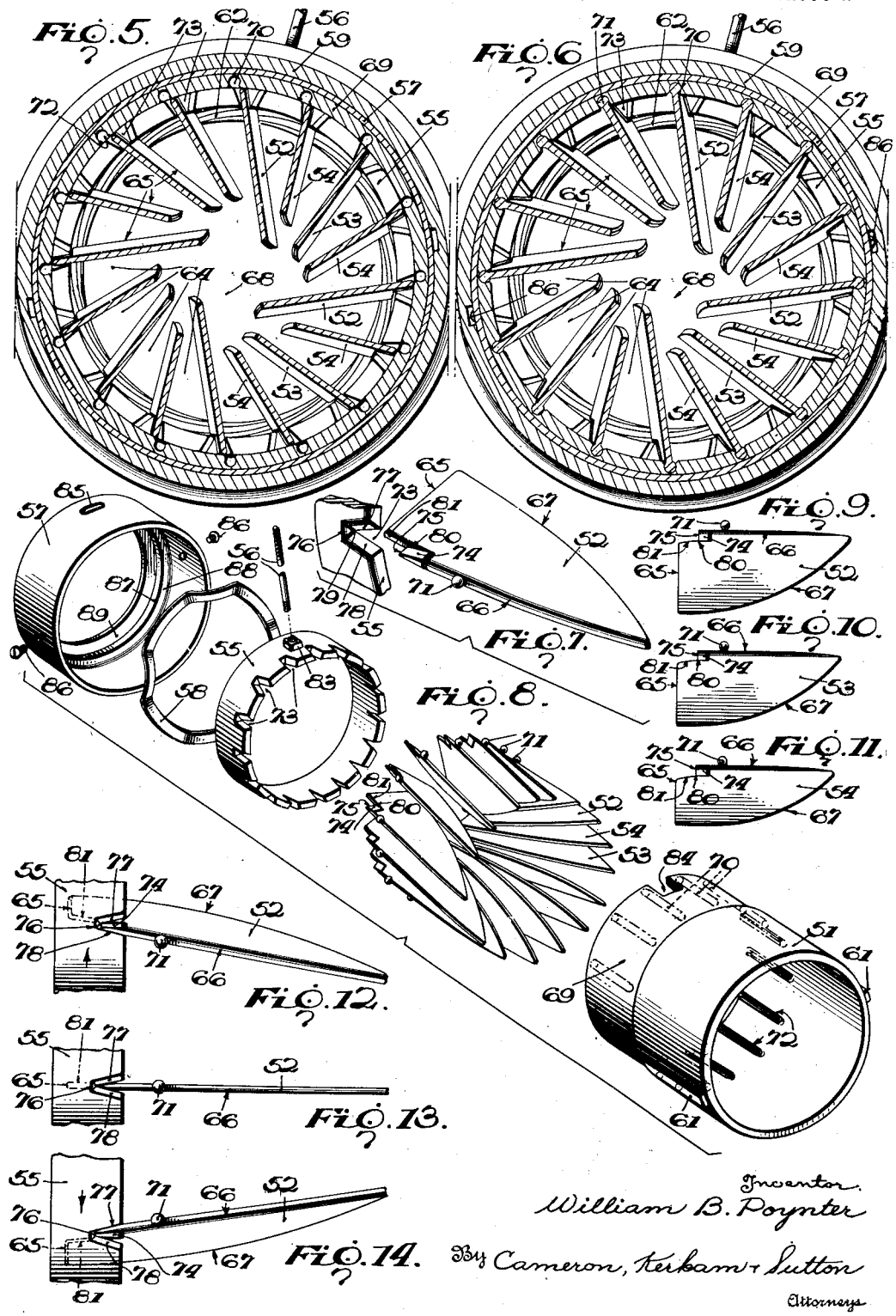
Inventor
William B. Poynter
By Cameron, Kerkam & Sutton
Attorneys

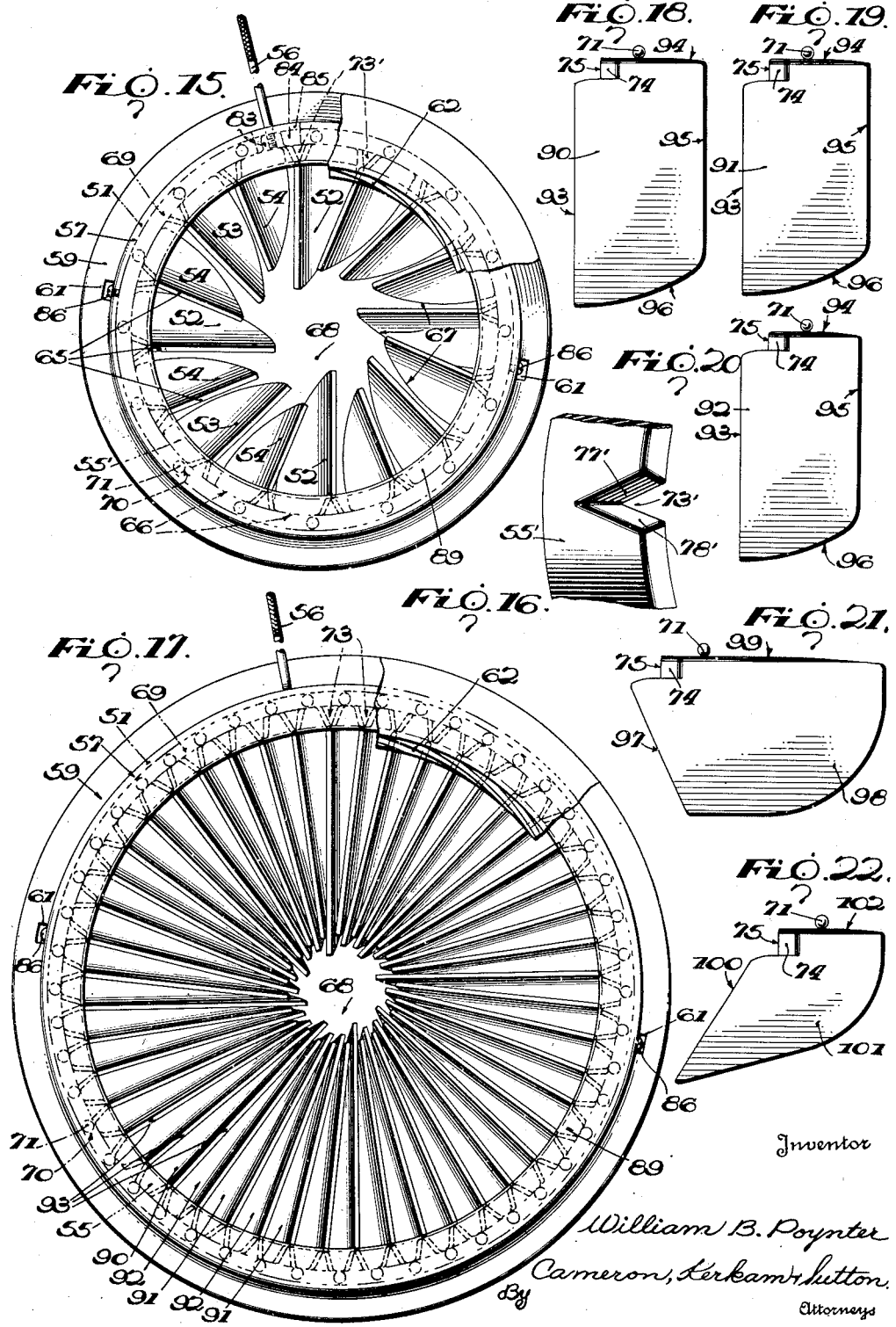

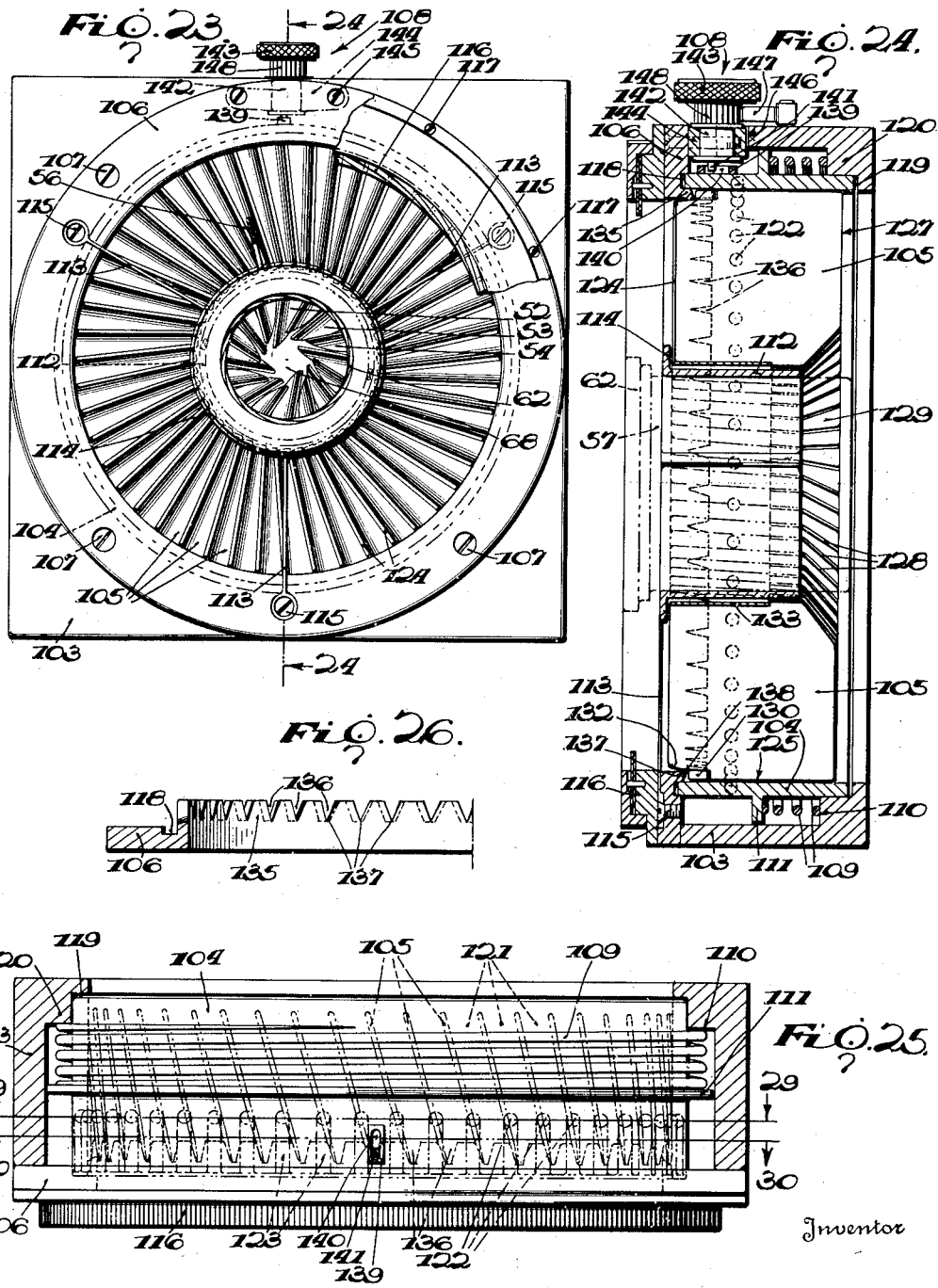

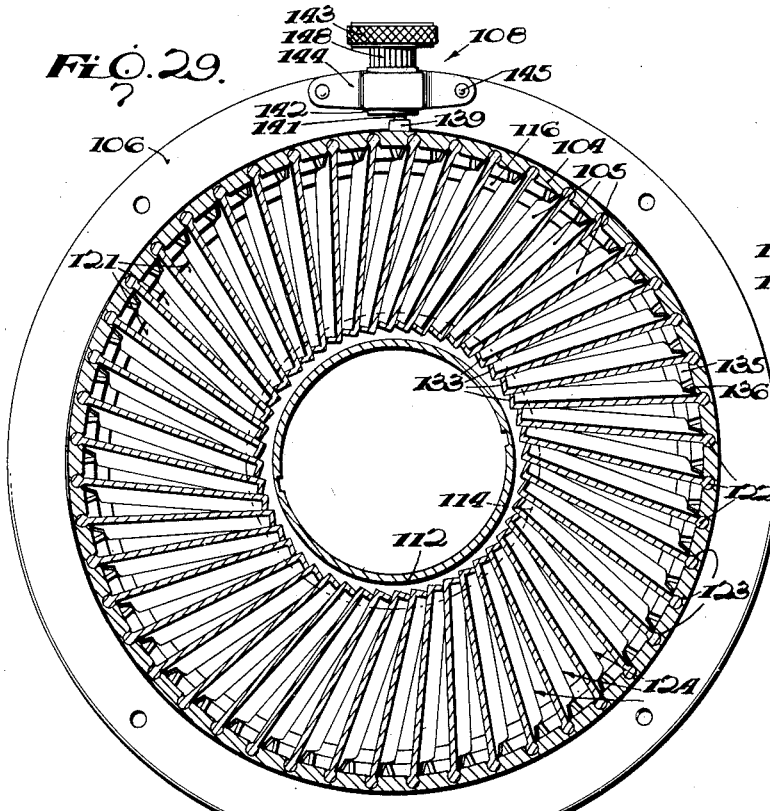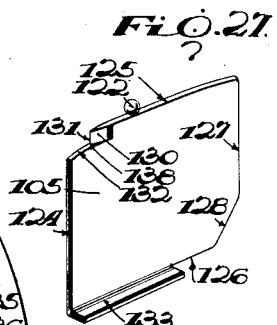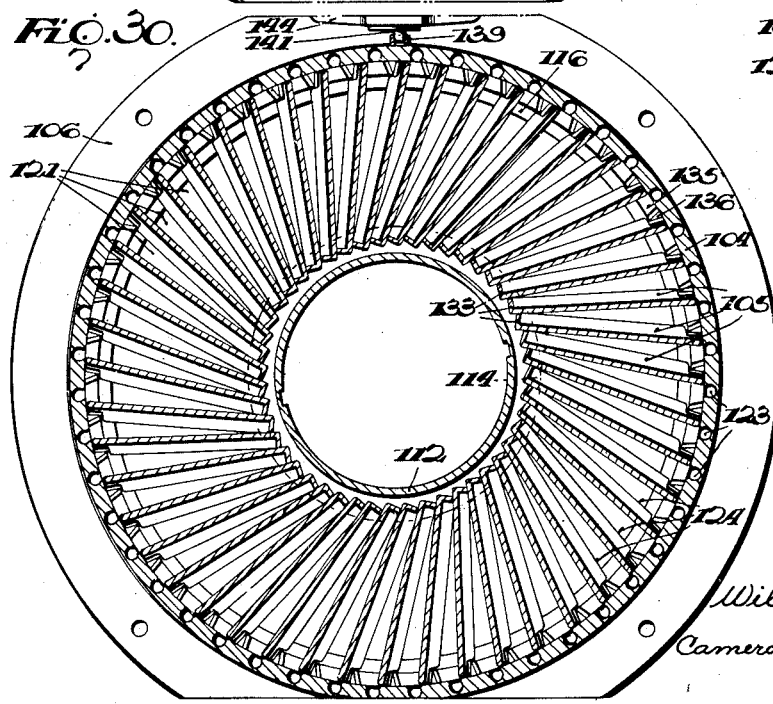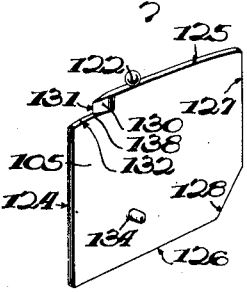

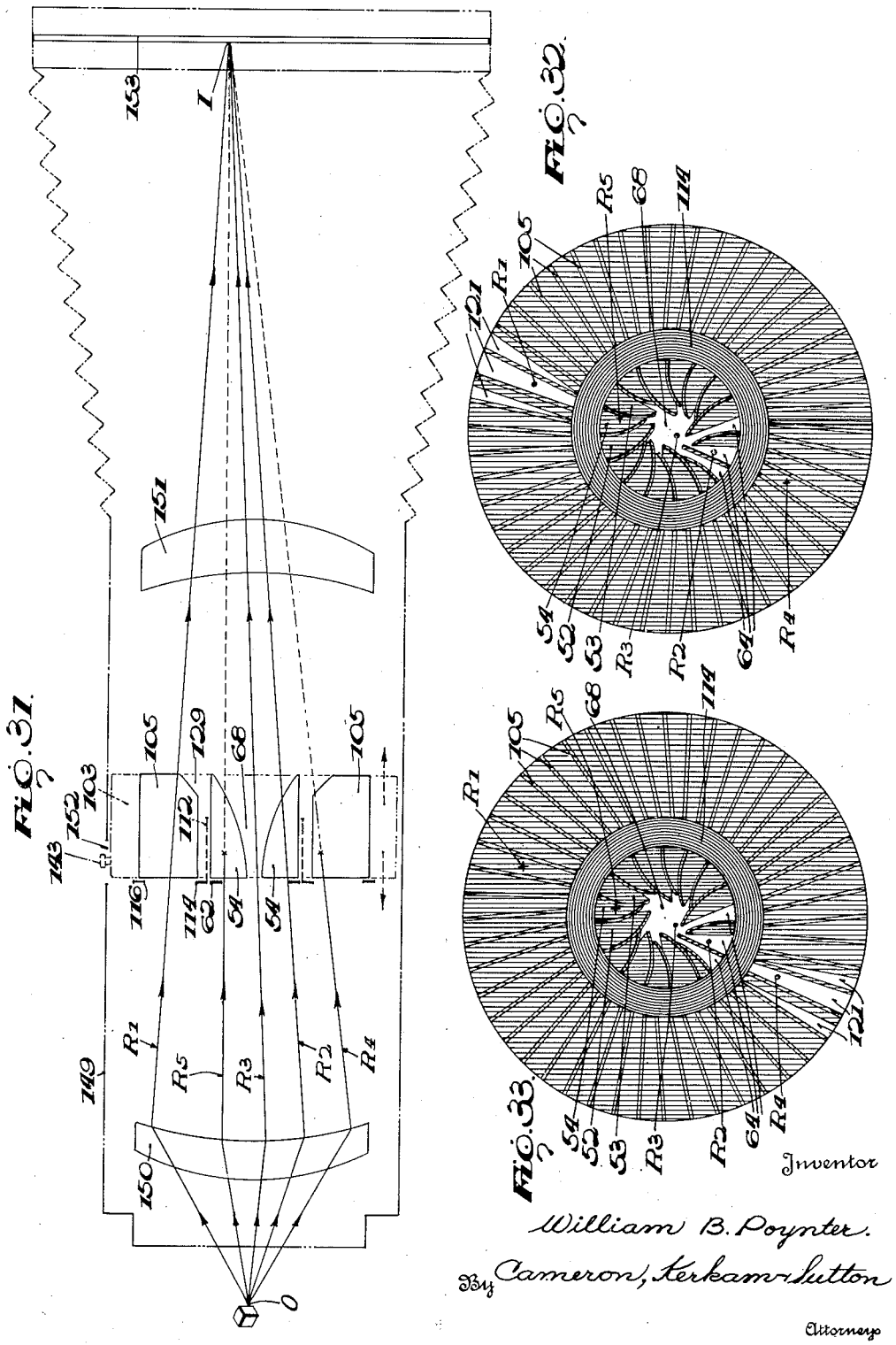

Patented Aug. 22, 1944

2,356,178

UNITED STATES PATENT OFFICE 2,356,178

LIGHT CONTROL DEVICE

William B. Poynter, Cincinnati, Ohio

Application October 23, 1940, Serial No. 362,440

18 Claims. (Cl. 95—64)

This invention relates to devices for controlling the passage or projection of light rays through optical instruments, and is particularly concerned with means which are capable of embodiment in optical instruments of various types and of producing new and hitherto unattainable results in the operation of such instruments.

The general objective of the present invention is to provide a device of novel character which is capable of so controlling the light rays passing through an optical instrument as to selectively limit, as desired, the rays impinging upon any particular portion of the area of the terminal or light sensitive element of the instrument to those rays which approach the device from definitely limited portions of the field of the instrument and along definitely limited paths. In other words, the device is adapted to permit only certain of the light rays entering an instrument from the object toward which it is directed, or from the source with which it is associated, to pass through the instrument and reach what may be termed the light exit end of the latter, and to select those particular rays according to the directions of their paths of travel and the portions of the area of the lens or other element of the optical system of the instrument from which they approach the device.

In view of the difficulty that would be encountered in expressing abstractly the various other objects of the invention, or in adequately describing the numerous specific applications that may be made of the scientific principles upon which it is based, the remainder of this disclosure will be primarily directed to mechanical embodiments of the invention especially adapted for use in the field of ordinary still photography, although it is to be expressly understood that the generic aspects of the inventive concept will find equal, if not greater, utility in connection with other types of optical instruments, such as those relating to motion picture photography, X-ray photography and fluoroscopy, television, beam projection, astronomical and terrestial observation, surveying, distance and area mensuration, and aerial mapping. A thorough understanding of the specific subject matter herein disclosed should give rise to a comprehension of the broader objects and usefulness of the invention.

With particular reference, therefore, to the photographic art, it is one of the objects of this invention to provide a device of new and relatively simple mechanical construction which, when incorporated in a camera having a suitable lens system, will control the projection of light rays upon the sensitized surface of a plate or film in such a way as to produce truer, more definite images of the objects being photographed, and pictures having greater depth and more desirable lighting effects, than can be obtained with cameras of known construction.

Another object is to provide an optical element of the character described by which it is possible to so select the light rays reaching any particular portion of the plate as to avoid the normally occurring, indiscriminate piling up of partial images on each point of the sensitized surface, and the undesirable results which follow from such "confusion" of the rays emanating from myriad points on the emergent face of a lens.

A further object is to provide a novel device for variably controlling the intensity of the light to which the various portions of a photographic plate are exposed, and at the same time shielding each elemental area of said plate against all rays except those which emerge from selected portions of the lens surface along paths of definitely limited directions.

Still another object is to provide a light controlling mechanism by which the light falling upon any particular portion of a photographic plate may be limited to groups of rays emanating from certain different areas on the surface of a lens, and whereby both the circumferential and the radial positions of said areas relatively to the lens surface, as well as the sizes of said areas, may be varied as desired in order to produce different photographic effects.

In the conventional camera, each point of the plate receives rays which emerge from all parts of the lens, the only control being that afforded by a variable stop diaphragm which merely cuts off more or less of the rays emanating from the peripheral portion of the lens. With the device of the present invention, however, it is possible to obtain an effect which may be described as the equivalent of tightly stopping down a central diaphragm while simultaneously superposing upon the image produced by the rays transmitted through the diaphragm aperture other partial images each limited to a relatively small area of the plate and each produced by rays which originate from a relatively restricted portion of the object, the latter rays including those emanating from peripheral areas of the lens from which no rays are able to pass through the diaphragm aperture. While this characterization of the invention may not be considered technically exact from the standpoint of presently accepted concepts of the science of optics, it is believed to be a fairly accurate description of the nature of the invention in the terminology now known to the art. The inadequacy of that terminology to completely express the novel concepts upon which the invention is based will become more apparent as the disclosure proceeds.

In its simplest form, the invention consists of a cylindrical tube or barrel through which light is intended to pass and a plurality of light obstructing blades mounted inside the barrel, said blades being so shaped, and arranged at such angles to the central axis of the barrel, as to form a number of light transmitting channels each of which passes only a limited group of rays approaching the light entrance end of the barrel from a restricted portion of the area of its field and along paths of definitely limited directions.

In such a device, which may be termed the basic unit of the invention, the blades may be either fixed or movable, and are susceptible of relatively wide variation in shape, size, number and position, depending upon the characteristics of the optical instrument in which the unit is to be embodied and the particular result or effect which it is desired to obtain. For certain uses, including ordinary still photography, it is preferable that adjacent blades of the basic unit be of different sizes, but that all terminate short of the axis of the barrel so as to provide an unobstructed central well of restricted size through which a solid cone of rays may pass in a manner comparable to that resulting from the use of a stopped down diaphragm in a conventional camera, in addition to the surrounding group of light transmitting channels of definitely limited width and direction formed by the blades, each of which channels passes a generally sector-shaped group of rays which come to the unit from a localized portion of the field and are delivered by the unit to a similarly localized portion of the area of the plate or other light receiving element of the instrument. With such a construction, the degree of light control exercised by the unit may be varied not only by changing the angularity, shape or number of the blades, but also by changing the size of the central well. In other installations, where even more critical control of the light is desired, the blades may be so shaped and arranged as to leave no open central well whatever, but to divide the entire bore of the barrel into individual light controlling channels.

While the basic unit has a variety of uses by itself, the present invention also encompasses the combination thereof with a supplementary unit of generically the same character, but which is of annular construction and adapted to surround the basic unit when the two are used together. That is, the central well of the supplementary or outer unit is so constructed as to receive and hold the basic or inner unit, the combination of the two units adding to the control of the light provided by the central well and surrounding channels of the inner unit, that which is afforded by the blades of the outer unit.

One of the advantages of a combination of two such units is that the blades of the outer unit may be pitched at different angles than, or even in the opposite direction to, those of the inner unit so as to restrict the light reaching any particular portion of the light receiving element of the instrument to two relatively small groups of rays originating at the same point on the object or source, but travelling to the instrument along differently directed paths, plus those rays which pass through the central well of the inner unit. Referring again to photography, simply by way of example, the result is to focus on any one point of the plate only a relatively small proportion of the rays which originate at the corresponding point on the object and actually enter the lens system of the camera, and, by suitable selection of those rays which ultimately reach the plate, to produce photographic effects of a character not hitherto attainable with ordinary equipment, particularly insofar as the appearance of depth and solidarity is concerned.

Although it will become obvious from the following disclosure that the novel features of the present invention may be incorporated in devices of widely varying size, purpose and mechanical construction, there are illustrated in the accompanying drawings and hereinafter described in detail one specific form each of a basic or inner unit and a supplementary or outer unit embodying the inventive concept, together with modifications in certain of the parts of said units, the structures shown being particularly adapted for use in combination with one another for photographic purposes. It is to be expressly understood, however, that these drawings are intended to be illustrative only, and are not to be construed as defining the scope of the invention, for which latter purpose reference should be had to the appended claims.

In the drawings, wherein like reference characters indicate like parts throughout the several views:

Fig. 1 is an end elevation of one form of light control device embodying the present invention, but with the major portion of a conventional diaphragm forming a part of the device broken away in the interest of clarity, said device being an example of the so-called basic unit, and the view being taken looking in the same direction as that in which the light to be controlled approaches the unit;

Fig. 2 is a side elevation of the device shown in Fig. 1, but with the unit holder shown in section in order to enable clearer illustration of the unit itself;

Fig. 3 is an axial sectional view of the device of Figs. 1 and 2 taken substantially on the line 3—3 in Fig. 1;

Fig. 4 is another end elevation of the device shown in Fig. 1, looking toward the light exit end thereof;

Figs. 5 and 6 are transverse sectional views of the unit of Figs. 1-4 taken substantially on the lines 5—5 and 6—6, respectively, in Fig. 2;

Fig. 7 is a perspective view of one of the light controlling blades and the cooperating portion of the blade adjusting ring of the unit of Figs. 1-6, the blade being shown in a position displaced from that which it occupies relatively to the ring when assembled therewith;

Fig. 8 is another perspective view showing the various elements of the unit of Figs. 1-6 in pulled out or separated position, and indicating the manner in which they may be assembled;

Figs. 9, 10 and 11 are plan views of the three different forms of blades embodied in the device of Figs. 1-6 and 8, these three figures showing the relative sizes and shapes of the large, intermediate and small blades, respectively;

Figs. 12, 13 and 14 are diagrammatic views of a single blade and the cooperating portion of the adjusting ring of the unit of Figs. 1-6 and 8 indicating the manner in which the positions of the blades may be varied by movement of the ring, Fig. 13 showing the blade in a neutral position, wherein it is coplanar with the central axis of the unit, while Figs. 12 and 14 indicate how the angularity of the blade may be changed both longitudinally and transversely in both directions from its neutral position;

Fig. 15 is an end elevation of a modified form of unit embodying the invention, looking in the same direction as Fig. 1, the construction illustrated being substantially the same as that shown in Figs. 1–14 except that the angularity of the blades may be varied about only one axis, instead of two; that is, while the blades of Fig. 15 may be adjusted about axes passing radially through the central axis of the unit, they do not also tilt away from said central axis as in the embodiment of Figs. 1–14;

Fig. 16 is a perspective view of a fragmentary portion of the blade adjusting ring of the unit of Fig. 15 showing the form of blade receiving notch which prevents tilting of the blade while at the same time enabling its movement about a radially extending axis;

Fig. 17 is an end elevation of the same character as Figs. 1 and 15 of still another modification of the invention, this construction having a larger number of blades than the units of Figs. 1–16, said blades also being of different shapes and sizes, and being differently arranged, than those of the first two embodiments;

Figs. 18, 19 and 20 are plan views of the three different forms of blades embodied in the device of Fig. 17, these three figures showing the relative sizes and shapes of the large, intermediate and small blades, respectively;

Figs. 21 and 22 are plan views of two other types of blades which may be used in devices embodying the invention, these two figures illustrating the fact that the shape and size of the blades may be varied as desired in order to produce different light controlling effects;

Fig. 23 is an end elevation showing the basic or inner unit of Figs. 1–14 combined with one form of supplementary or outer unit constructed in accordance with the invention, this view being taken looking in the same direction as Fig. 1, but being on a substantially smaller scale than the latter, and, like the latter, omitting all but a fragment of a conventional type diaphragm forming a part of the outer unit;

Fig. 24 is an axial sectional view of the device shown in Fig. 23 taken substantially on the line 24—24 in the latter, but indicating the basic or inner unit in broken lines only in the interest of clarity, Fig. 24 being on a larger scale than Fig. 23, approximately half that of Figs. 1–6;

Fig. 25 is a plan view of the outer unit of Figs. 23 and 24, with the casing sectioned in a horizontal plane through the central axis of the device and certain other parts broken away and omitted in order to more clearly illustrate the construction of the outer unit;

Fig. 26 is a half axial sectional view of the blade adjusting ring of the outer unit of Figs. 23—25, which ring is fixed instead of movable as in the inner or basic unit illustrated.

Fig. 27 is a perspective view of one of the blades of the outer unit of Figs. 23–25;

Fig. 28 is a perspective view of a modified form of blade which might be used in the outer unit of Figs. 23–25;

Figs. 29 and 30 are transverse sectional views of the outer unit of Figs. 23–25 taken substantially on lines 29—29 and 30—30, respectively, in Fig. 25;

Fig. 31 is a diagrammatic view illustrating one way in which the dual unit device of Figs. 23—30 may be used for photographic purposes, and indicating how only certain of the light rays entering the camera along paths which would ordinarily bring them to focus at a single point on the plate are permitted to pass through the device, while others are cut off;

Fig. 32 is a diagrammatic view of the light exit end of the device illustrated in Fig. 31 indicating how it would appear from the point on the plate toward which the rays shown in Fig. 31 are directed; and Fig. 33 is a diagrammatic view of the same character as Fig. 32, but indicating the effect of reversing the angularities of the blades of the outer unit.

Referring now to Figures 1–14, there is disclosed therein one form of light control device constructed in accordance with the present invention which is particularly adapted for use in conjunction with the lens system of a camera, although, as has been previously pointed out, photography is only one of the fields in which the invention has utility. The device illustrated is an embodiment of the so-called basic unit, and consists essentially of a cylindrical tube or barrel 51 through which the light to be controlled is adapted to be passed, a plurality of light controlling blades 52, 53 and 54, of three different sizes and shapes, mounted inside of the barrel, a blade adjusting ring 55 also mounted within the barrel and having operative engagement with the blades such as to vary the angularities of the latter when the ring is rotated relatively to the barrel, an operating handle 56 for moving the adjusting ring, a cap member 57 fitting over and removably secured to the light entrance end of the barrel adapted to retain the blades and adjusting ring in proper position within the latter, and an annular spring 58 of the corrugated ribbon type interposed between the cap member 57 and adjusting ring 55 for yieldably maintaining said ring in operative engagement with the blades.

The basic unit as thus constituted may be mounted in a camera in any suitable manner, as by means of a cylindrical or tubular holder 59 which is externally screw threaded at 60 for connection to an appropriate part of the camera construction, and internally grooved to receive a pair of longitudinally extending ribs or splines 61 formed on the barrel 51 which are adapted to permit adjustment of the barrel relatively to the holder in an axial direction, but to prevent relative rotation therebetween. The holder 59 is preferably shorter than the barrel 51 so that it will not extend beyond the rear end of the barrel and interfere with the light issuing from the latter, even when the barrel is adjusted to its extreme forward position. The unit may also be provided at its light entrance end with a variable stop diaphragm 62 of any suitable construction, the diaphragm being removably secured to the cap member 57 as by screws 63.

The blades 52, 53 and 54, the relative sizes and shapes of which are shown in Figs. 9, 10 and 11, respectively, are made of, or coated with, an opaque, light absorbing material, and are so mounted within the barrel 51 as to provide a plurality of light transmitting channels 64 (see Figs. 5 and 6, in particular) each of which is approximately sector-shaped in cross section, relatively restricted in width, and capable of permitting the passage therethrough of only those light rays which approach the unit along paths of definitely limited directions. The amount of light which is permitted to pass through the channels 64 can be variably controlled, and the groups of light rays thus transmitted can be selectively regulated in accordance with the portions of the field of the device from whence they come and the directions of the paths along which they travel, not only by changing the shapes, sizes and number of the blades (for which purpose the blades of the illustrated embodiment are individually removable from the barrel), but also by varying the angular positions of the blades within the barrel.

The diaphragm 62 may also be used in the usual manner to variably control the amount of light admitted to the unit and thus supplement the action of the blades, although it is to be expressly understood that the presence of the diaphragm, while helpful to a certain degree, is not essential to the successful operation of the device of the present invention.

In the structure shown in Figs. 1–6 and 8, there are four large blades 52, positioned 90° apart with respect to the bore of the barrel 51, four blades 53 of intermediate size, each located halfway between two adjacent large blades, and eight small blades 54, one positioned in each of the spaces left between the large and intermediate blades. Each of the blades 52, 53 and 54 is provided with a straight leading edge 65, a base or bottom edge 66 which, while curved and rounded slightly to permit adjustment of the blade without binding against the bore of the barrel, is generally perpendicular to the leading edge 65, and a curved trailing or top edge 66. Although the specific dimensions of the three sizes of blades differ in the manner indicated in Figs. 9, 10 and 11, their shapes are generally similar, and they are so mounted that all of the leading edges 65 lie in substantially a single plane perpendicular to the central axis of the barrel, which plane may be termed the light entrance plane of the unit. The effective area of this light entrance plane is normally established and may be variably controlled by the diaphragm 62, or, in cases where the diaphragm is omitted, is permanently defined by the blade adjusting ring 55. When the diaphragm is used, its maximum opening is preferably at least equal to the diameter of the adjusting ring.

Inasmuch as the leading edges 65 of even the large blades 52 are, in the embodiment illustrated, of a length less than the radius of the bore of the barrel 51, the central portion of said bore is left in the form of an open, unobstructed well 68 which is generally frusto-conical in shape, the well being of relatively small diameter at the light entrance end of the unit, but, because of the curvature of the trailing edges 67 of the blades, increasing in size toward the light exit end thereof.

With this construction, it will be obvious that light rays which impinge upon the light entrance plane of the unit at points within the circumference of the forward end of the well, and which are traveling along paths whose angularities with respect to the central axis of the unit do not exceed certain limits determined by the curvatures of the trailing edges 67 of the blades, will pass freely through the well and spread uniformly over the entire area of the light exit end of the unit in a manner comparable to the action of light in passing through a relatively tightly stopped diaphragm in an ordinary camera, whereas the rays which reach said plane at points outside the circumference of the well are prevented from passing through the unit by the projected areas of the inclined blades, except those rays the directions of whose paths are such as to lie within the confines of the light transmitting channels 64.

In Figs. 1–6, the blades are shown in positions such that each has a compound angularity with respect to the central axis of the unit; that is, not only does the base of each blade lie at an acute angle (approximately 10° in the position illustrated) to any line intersecting said base which is parallel to the central axis of the barrel, but the plane of the blade is also tilted away from said axis in such a manner that the leading edge thereof makes an acute angle (approximately 10° as shown) with a perpendicular to the central axis passing through the intersection between said edge and the blade base. In other words, the entire plane of each blade is so off-set with respect to the central axis of the unit that said plane and axis have no intersection. Consequently, none of the light rays passing through the channels 64 will intersect or cross the unit axis, or interfere with the rays which are transmitted through the central well.

While the particular positioning of the blades illustrated will provide a satisfactory control of light under certain conditions, it is desirable that the blades be adjustable to various other positions, both closer to and further away from the neutral position wherein each blade is coplanar with the axis of the barrel, and in both directions from neutral, in order to enable use of the device under different conditions and for the attainment of different photographic effects.

In the structure illustrated, adjustability of the blades is accomplished by connecting the base or bottom edge of each blade to the barrel by a sort of universal joint, and so forming the adjusting ring and the cooperating portions of the blades that a simple rotative movement of the ring will serve to simultaneously vary the inclination of all blades both longitudinally and transversely, thereby producing the compound angularity previously described.

To this end, the barrel 51 is provided with a portion 69 of reduced wall thickness adjacent the light entrance end of the unit, in which portion are formed a plurality of axially extending grooves 70, equal in number to the total number of blades 52, 53 and 54, and disposed uniformly about the circumference of the barrel, each of which grooves is adapted to receive a ball 71 secured to the base 66 of one of the blades and forming a spherical pivot for said blade. As is shown best in Figs. 3, 5 and 8, the grooves 70 extend almost the full length of portion 69 of the barrel, and are of circular cross section, tangent to the inner surface of the barrel, so as to form socket bearings for the ball pivots 71, the opening or entrance into each groove from the interior of the barrel preferably being enlarged by cutting away the barrel wall, as indicated at 72, in order to provide a beveled mouth for each groove which facilitates insertion and removal of the blade pivots, as well as adjustment of the blades after the unit has been assembled. When the blades are in proper position within the barrel, the ball pivots 71 are in engagement with the closed ends of grooves 70.

In order to impart a compound angular movement to the blades about their ball pivots 71, the rear edge of the adjusting ring 55 (that is, the edge closest to the light exit end of the unit)

is provided with a plurality of specially formed notches 73, equal in number to the total number of the blades and uniformly spaced circumferentially of the adjusting ring, each of which notches is adapted to receive a wedge-shaped portion 74 of one of the blades. Because of its function in guiding or controlling the positioning of the blade, the portion 74 may be termed the rudder portion of the blade.

As will be seen best from Figs. 7 and 9–11, the rudder portion 74 of each blade lies intermediate the ball pivot 71 and the leading edge 65, and is formed by cutting out the corner of the blade at the intersection of the leading edge and the base 66, and then beveling the sides of the blade toward the edge 75 which is substantially perpendicular to the base 66 and is adapted to be seated in the bottom of the cooperating notch 73 of the adjusting ring.

Each of the notches 73 is of the form illustrated in Fig. 7, being strictly V-shaped at its intersection with the inner cylindrical wall of the ring 55, but flaring outwardly toward the outer cylindrical surface of said ring so as to provide an approximately triangular base 76 for the notch and a pair of side walls 77 and 78. The planes of the side walls 77 and 78 intersect at the point 79, which is the apex of the notch base 76 at the inner cylindrical surface of the adjusting ring, but diverge from one another in both axial and radial directions at angles which are approximately equal to the angles through which the blade is both turned and tilted in passing from one extreme position to the other. The plane of notch base 76 is also preferably inclined from its apex 79 toward the forward edge of the adjusting ring 55 so that there will be practically only point contact between the rudder edge 75 of the blade and the notch base 76, those points being the apex 79 of the notch and the point 80 where the rudder edge 75 intersects the edge 81 which bounds the upper side of the cut-out corner of the blade. As is indicated in the drawings, the edge 81, which may be termed the sub-base of the blade, is also slightly curved and rounded similarly to base 66 in order to avoid frictional contact with the inner cylindrical surface of adjusting ring 55 when the position of the blade is varied.

Inasmuch as the point 80 on rudder edge 75 is displaced both longitudinally and transversely of the blade with respect to ball pivot 71, it will be seen that any rotational movement of the blade adjusting ring 55 relatively to the barrel 51 will not only swing the blade about an axis passing through the ball pivot 71 substantially perpendicular to the blade base 66, but will also tilt the blade about a second axis also passing through the ball pivot 71, but substantially parallel to said blade base.

While various means may be employed for rotating the adjusting ring 55 within the barrel 51, including gearing and the like, the unit illustrated in Figs. 1–6 and 8 embodies the relatively simple mechanical expedient of an adjusting handle 56 which may be removably connected to the adjusting ring 55 as by threading into a boss or lug 83 secured to and projecting outwardly from the outer cylindrical surface of the ring. When the unit is assembled, the lug 83 is received in a slot or opening 84 formed in the forward edge of the portion 69 of the barrel, the circumferential dimension of the opening 84 being such as to permit movement of the lug 83 therein through a sufficient distance to effect the desired adjustment of the blades in both directions from neutral, the sides of the opening forming stops which prevent movement of the adjusting ring beyond the points of maximum blade deflection.

The cap member 57, which is adapted to fit over the barrel portion 69, is also provided with a suitable elongated opening 85 in its circumferential wall through which the adjusting handle 56 may extend, the cap member being secured in proper position relatively to the barrel, with the openings 84 and 85 in alignment, by any suitable means, such as set screws 86. In order to avoid interference with reception and axial adjustment of the barrel in the holder 59, the set screws 86 are so positioned that, when the unit is assembled, they lie in axial alignment with the splines 61 of the barrel. In this latter connection, it will also be noted that the cap member 57 is of the same outside diameter as the main portion of the barrel 51 so as to provide the unit with an outer surface of uniform diameter, the inner diameter of the cap member being enlarged to conform to the outside diameter of the barrel portion 69 except in the portion 87, between the shoulder 88 and the forward end of the cap, where the inside diameter of the cap is substantially the same as that of the barrel. As will be seen best from Fig. 3, when the unit is assembled, the shoulder 88 of the cap member abuts against the forward edge of barrel portion 69, while the portion 87 of the cap member embraces the forward end of the adjusting ring 55 which projects slightly beyond the end of the barrel.

In view of the fact that changes in the angularity of the blades produce corresponding changes in the axial distance between the plane in which lie all of the points 80 of the blade rudder edges 75 and the plane of the ball pivots 71, the adjusting ring 55 must be capable of a slight axial, as well as rotational, movement relatively to the barrel so as to always maintain proper engagement between the adjusting ring notches 73 and the rudder edges 75 of the blades. To this end, the forward end of the cap member is provided with a radially inwardly extending lip 89 which is of substantially the same radial dimension as the wall thickness of adjusting ring 55, and is adapted to overlie the forward edge of said ring. The previously identified spring 58 is interposed between the lip 89 and the forward edge of ring 55, and serves to continually urge the ring toward the rear end of the unit and thereby maintain the desired point contact between the apices 79 of the notches 73 and the points 80 on the rudder edges 75 of the blades.

When the elements of the unit are assembled in the manner indicated, and the adjusting ring 55 is so positioned by means of the handle 56 that the lug 83 occupies a central position in opening 84, all of the blades will lie in neutral or entirely radial positions, as shown in Fig. 13, at which time they exert the minimum control over the passage of light through the barrel, and the photographic results attained would approximate those resulting from the use of conventional camera equipment. If the adjusting ring is then turned counterclockwise (viewing the unit from the light entrance end, as seen in Fig. 1), all of the blades will be given a compound movement about their ball pivots 71 such that the leading edges 65 will not only be moved in a counterclockwise direction from their neutral positions, but will also be tilted away from the central axis of the unit, also in a counterclockwise direction, the resulting positions of the blades being similar to those indicated in Figs. 1–6 and 12. Movement of the adjusting ring in a clockwise direction from neutral position will reverse the angularities of the blades both longitudinally and transversely, as indicated in Fig. 14. It will be noted that movement of the blades in either direction from neutral results in bringing the wedge-shaped rudder portion 74 of each blade closer to one or the other of the side walls 77 and 78 of its associated notch 73, the angularities of these walls being so selected that, when the blade reaches its maximum desired deflected position, the rudder portion 74 comes into full abutment with one of the side walls of the notch.

The greater the deflection of the blades from their neutral positions, the more critical or selective is the control exercised over the passage of light through the channels 64. For many purposes, it is preferable that the maximum permissible deflection of the blades be that which completely shuts off transmission of light through the channels 64, leaving open only the central well 68. The blade angularities necessary to produce this latter result will, of course, depend upon the optical characteristics of the instrument in which the unit is embodied, the relative position of the unit in the instrument, particularly with respect to the lens or other element from which light enters the unit, the size, shape and number of the blades, and similar factors which will vary with each particular installation.

In certain instances, it may be satisfactory to impart to the blades only a simple, rather than a compound, angular movement with respect to the ball pivots 71. For example, the angularities of the blade bases may be varied relatively to the central axis of the unit without simultaneously tilting the blades away from that axis by simply substituting for the blade adjusting ring 55 of Figs. 1–8 and 12–14, a similar ring 55' (Fig. 16) having notches 73' which are strictly V-shaped at their intersections with both the inner and outer cylindrical walls of the ring; that is, the side walls 77' and 78' of the notch themselves intersect to form the base of the notch, instead of flaring away from one another as in the previously described embodiment. When using an adjusting ring of this modified construction, the blades assume the positions illustrated in Fig. 15 when deflected by a movement of the adjusting ring comparable to that represented in Fig. 1.

As has already been mentioned, the passage of light through the unit may be controlled and regulated by varying the shapes, sizes and number of the blades, as well as by varying their angular positions. The unit illustrated in Figs. 17–20 is one example of a construction embodying a larger number of blades, of different sizes, shapes and arrangement, than the units of Figs. 1–16.

The barrel of the unit shown in Fig. 17 is of substantially greater diameter in proportion to its axial length than those of the first two embodiments, and is adapted to contain a total of forty-eight blades, instead of sixteen, there being eight large blades 90 arranged at 45° intervals, sixteen blades 91 of intermediate size dividing each of the intervals between the large blades into three equal parts, and twenty-four small blades 92, one positioned in each of the spaces left between the large and intermediate blades. As will be seen from Figs. 18, 19 and 20, wherein are illustrated the relative sizes and shapes of the large, intermediate and small blades, respectively, each blade is provided with a straight leading edge 93, a base or bottom edge 94, a straight rear or trailing edge 95 parallel to the leading edge 93, but of somewhat less height than the latter, and a curved top edge 96. Aside from the characteristics of the blades themselves and the corresponding modifications required in the construction of the barrel, adjusting ring and cap, the structure of Fig. 17, including the means by which the blades are adjusted and the character of the adjustment imparted thereto, is substantially the same as that of Figs. 1–14.

The increase in the number of blades, as well as the fact that they approach the central axis of the unit more closely than do the blades of the first two embodiments, enables the unit of Fig. 17 to more critically control the light rays passing therethrough than is possible with units of the constructions illustrated in Figs. 1–15.

Figs. 20 and 21 show two still different forms of blades which may be embodied in the basic unit of the present invention, the principal difference between these two blade forms and those illustrated in Figs. 9—11 and 18–20 being that the leading edges thereof are inclined, rather than perpendicular, to the bases thereof. For example, the leading edge 97 of the blade 98 shown in Fig. 21 makes an acute angle with respect to the blade base 99, while the leading edge 100 of the blade 101 of Fig. 22 forms an obtuse angle with the blade base 102. When blades of such modified form are assembled in a unit of otherwise substantially the same construction as that shown in Figs. 1–8, the inclination of their leading edges with respect to the light entrance plane of the unit, as well as the different configurations of their trailing edges, will obviously vary the light transmitting characteristics of both the channels between the blades, and the central well.

Referring now to Figs. 23–30, there is shown therein still another embodiment of the present invention comprising a pair of coaxial light controlling units of generically the same character, but specifically different in construction, the inner unit being a duplicate of the basic unit illustrated in Figs. 1–14, while the outer unit is particularly adapted to supplement the operation of the inner unit in the production of new and unusual photographic effects and other results not attainable by cameras of conventional construction, or by the use of either of the two units by itself.

In the form shown, the principal elements of the supplementary or outer unit comprise a casing 103, which may be rectangular in outer configuration, particularly when the device is adapted for use in a relatively large plate type camera, a cylindrical barrel 104 mounted within the casing in such a manner as to be capable of relatively small axial and rotational movements within the latter, a plurality of light controlling blades 105 mounted within the barrel, a blade adjusting or positioning ring 106 fixed to the forward end of the casing 103 as by screws 107 and having operative engagement with the blades such as to cause the angularities of the latter to vary when the barrel 104 is rotated relatively to the casing, means, indicated generally at 108, for effecting such rotation of the barrel, a coil spring 109 interposed between an annular shoulder 110 formed interiorly of casing 103 and a flange 111 extending radially outwardly from the barrel 105 for yieldably urging the barrel toward the blade adjusting ring 106 so as to continually maintain the blades in operative engagement with said ring, and a cylindrical holder 112 for the cooperating inner unit supported in a centralized position within both the casing 103 and the barrel 105 by any suitable means, such as a plurality of struts 113 welded or otherwise fixed at their inner ends to a radially outwardly extending flange 114 formed on the holder 112 at the light entrance end thereof, and secured at their outer ends to the blade adjusting ring 106 as by screws 115, both the outer ends of the struts and the screws being countersunk in the forward face of said ring. The outer unit may also be provided at its light entrance end with a variable stop diaphragm 116 of any suitable construction, removably secured to the ring 106 as by screws 117, for controlling the effective size of the annular light entrance plane of said unit, the inner circumference of which is fixedly established by the edge of the flange 114 of the inner unit holder 112. In cases where no diaphragm is used, the outer circumference of the light entrance plane is permanently defined by the adjusting ring 106.

Inasmuch as the inner unit is of the same construction as that of Figs. 1–14, and is adapted to be adjustably mounted in the holder 112 in the same manner as has been previously described with reference to the holder 59, it has been omitted entirely from Figs. 25, 29 and 30, and has been shown in broken lines only in Fig. 24, in order to facilitate illustration of the construction of the outer unit. It will be understood, however, that the device is normally used with the inner unit properly positioned within the holder 112, and that both blades of the inner unit and its diaphragm 62 may be adjusted independently of the corresponding elements of the outer unit in order to produce the desired control of the light rays passing through this portion of the combined device. In this connection, it may also be noted that, after the blades of the inner unit have been moved to any desired position by means of the adjusting handle 56, the latter may be removed by unthreading it from the lug 83 so as to avoid whatever interference it might otherwise produce with the light rays approaching the blades 105 of the outer unit.

While the elements of the outer unit are generally similar in both structure and function to the corresponding parts of the inner or basic unit already disclosed, there are a number of details wherein the outer unit differs from the inner which will now be described.

Referring first to the barrel 104 and blades 105, it will be noted that the barrel is properly centered for rotation within the casing 103 both by contact of the outer periphery of its flange 111 with the inner cylindrical surface of the casing, and by virtue of the fact that the forward and rear ends of the barrel are received in grooves 118 and 119 formed, respectively, in the rear face of adjusting ring 106, and in the rear edge portion 120 of the casing 103 which is of greater wall thickness than the rest of the casing and also forms the shoulder 110 against which the spring 109 abuts. As is shown in Fig. 24, the length of the barrel is somewhat less than the distance between the bases of grooves 118 and 119 so as to permit the relatively small axial movement of the barrel under the influence of spring 109 which is necessary to maintain the blades 105 in cooperative engagement with the adjusting ring 106.

The blades 105, of which there are a total of forty-eight in the embodiment illustrated, are all of the same size and shape, and are so mounted in the barrel 104 as to provide an annular group of forty-eight identical light transmitting channels 121 of narrow, slot-like form, and variable direction, each of which channels will permit the passage therethrough of only those light rays which approach the outer unit along paths of definitely limited directions. In order to enable adjustment of the angular positions of the blades within the barrel so as to variably control the light which is permitted to pass through the channels 121, the blades are connected to the barrel by means of spherical or ball pivot members 122 secured to the blade bases and axially extending grooves 123 formed in the portion of the barrel wall forwardly of the flange 111, these grooves and ball pivots being of substantially the same construction as those indicated at 70 and 71 in Figs. 1–14.

As will be seen best from Fig. 27, each of the blades 105 is generally rectangular in shape, having a straight leading edge 124, a slightly curved and rounded bottom edge or base 125 to which the leading edge 124 is substantially perpendicular, a straight top or upper edge 126 also perpendicular to the leading edge 124, and a rear or trailing edge 127 which is parallel to the leading edge 124 except for the portion 128 which inclines rearwardly with respect to the upper edge 126 so as to form an open well 129 of frusto-conical shape (see Fig. 24) at the light exit side of the outer unit through which the rays issuing from the inner unit may pass without interference when the latter is moved forwardly in the holder 112 to a point where the light exit plane thereof lies forwardly of the plane of the trailing edges 127 of the outer unit. The amount and directional characteristics of the light transmitted through the channels 121 of the outer unit are also governed to some extent by the angularity and length of the inclined edge portions 128 of the blades. Each of the blades 105 is also provided with a rudder portion 130, a rudder edge 131 and a sub-base 132 similar to the corresponding portions of the blades of Figs. 1–14.

In view of the relatively large number of blades 105 embodied in the outer unit, and the fact that their top edges 126 lie relatively close to one another, just outside of the inner unit holder 112, when the unit is assembled, it is desirable that means be provided for positively ensuring that the top edge of each blade remains at the proper distance from the corresponding edges of the adjacent blades, regardless of the angularity to which the blades may be adjusted. In the embodiment illustrated in Figs. 23–27, 29 and 30, this end is accomplished by providing each blade 105 with a narrow strip 133 of blade material which projects at right angles to the plane of the blade from one side thereof along the forward portion of the top edge 126. The spacer thus formed by the strip 133 is of a width approximately equal to the distance which it is desired to maintain between the top edges of the blades when assembled, and is preferably shorter in length than the inner unit holder 112 so as not to interfere with the light rays which would otherwise pass through the device along lines tangent to the rear edge of said holder.

Instead of a spacer of this character, which may be conveniently formed by simply cutting the strip 133 integrally with the rest of the blade 105 and then bending it to right angles to the latter, each blade might be provided with a perpendicularly extending pin or lug 134 like that shown in Fig. 28, said pin preferably having a rounded nose and being so positioned that, when the unit is assembled, all of the pins will lie in substantially the same transverse plane as the ball pivots 122. If desired, spacers of the pin type may also be provided for the blades of the various other units disclosed herein, being particularly useful in a unit like that illustrated in Fig. 17 which employs a relatively large number of blades the top edges of which lie relatively close to the central axis of the unit.

The blade adjusting or positioning ring 106, which is fixed to the casing 103 instead of being movable as in the inner unit, includes a crown portion 135 which extends axially rearwardly into the forward end of the bore of the barrel 104, thereby forming still another supporting bearing for the barrel. As is shown best in Fig. 26, the rear edge of crown portion 135 is provided with a plurality of notches 136, equal in number to the total number of the blades 105 and uniformly spaced circumferentially of the crown, each of which notches is adapted to receive the wedge-shaped rudder portion 130 of one of the blades. In the embodiment illustrated, the notches 136 are of substantially the same configuration as the notches 73 of the unit of Figs. 1–14, the apex 137 of each notch 136 being adapted to serve as the support for the fulcrum point 138 on the rudder edge 131 of the associated blade 105, about which point the blade both turns and tilts when the barrel 104 is rotated relatively to the casing 103 and the blade adjusting ring 106. It will be recognized that this mechanism for varying the angularities of the blades of the outer unit represents, in effect, a reversal of the parts of the blade adjusting means of the inner unit, but that it is effective to produce the same compound off-set of the blades with respect to the central axis as has previously been described in connection with the unit of Figs. 1–14.

The means 108 by which the barrel 104 is rotated within the casing 103 may be of any suitable construction, that illustrated in Figs. 23–25 being particularly well suited for use when the device is to be embodied in a large plate type camera where, after the angularities of the blades of the inner unit have been adjusted to a certain position, it may be desired to vary the positions of the blades of the outer unit while simultaneously observing the effect of the variation upon the image on the plate.

In the form shown, the barrel 104 is provided with a boss 139 extending outwardly from and suitably secured to the barrel wall, as by welding, at a point adjacent the forward end of the barrel, this boss having an axially elongated slot 140 formed therein adapted to receive a pin 141 which projects downwardly from the lower end of an adjusting stub shaft 142, to the upper end of which is fixed a knurled adjusting knob 143. The stub shaft 142 may be journaled in a suitable split bearing 144, the two halves of which are secured to one another and to the rear face of the adjusting ring 106 in a top central position as by screws 145, the top wall of the casing 103 being appropriately recessed as indicated at 146 to receive said bearing.

The position of the pin 141 is eccentric to the axis of stub shaft 142 so that rotation of said shaft by means of the knob 143, with the pin 141 extending into the slot 140, produces rotational movement of the barrel 104. The eccentricity of the pin 141 and the length of the slot 140 are so selected that the amount of rotational movement which can thus be imparted to the barrel is sufficient to produce the desired range of variation in the angularities of the blades. As in the case of the basic or inner unit, it is preferable in most cases that the maximum deflection of the blades of the outer unit be sufficient to completely shut off transmission of light through the channels 121 between the blades. The slot 140 is preferably made of a length at least equal to the maximum throw of the eccentric pin 141 so that the knob 143 may always be turned in the same direction to adjust the blades. In this latter connection, it may also be desirable to mount a suitable pawl 147 on the top of the casing 103 adjacent the stub shaft 142, and to provide the portion of said shaft beneath the knob 143 which extends above the top of said casing with ratchet teeth 148 for engagement by the pawl, so as to prevent accidental movements of the shaft which might move the blades out of their desired adjusted positions.

In assembling the dual unit device of Figs. 23–30, the blades 105 are first inserted in the barrel 104 while the latter rests in a horizontal position on its light exit end, the blades thereby automatically assuming their neutral or entirely radial positions, and then the adjusting ring 106 is lowered into place until the apices 137 of the notches 136 contact the fulcrum points 138 on the blade rudder edges 131. The pin 141 of the stub shaft 142 is next inserted in the slot 140 of the boss 139, whereupon the bearing 144 may be closed about the shaft and secured to the adjusting ring 106. The parts thus assembled are then telescoped with the casing 103 and secured thereto by the screws 107, after which the diaphragm 116 may be connected to the front face of the adjusting ring 106 by the screws 117. The inner unit, having first been assembled in the manner previously indicated in connection with the embodiment of Figs. 1–14, is next inserted in its holder 112 and adjusted axially until the blades thereof occupy the desired position relatively to those of the outer unit. The blades of each unit may then be individually adjusted to their desired angularities by means of the adjusting handle 56 and knob 143, respectively, whereupon the device is ready to be placed in proper position in the camera or other instrument with which it is to be used.

There has been diagrammatically illustrated in Fig. 31, solely by way of example, one way in which the dual unit device of Figs. 23–30 may be used for photographic purposes, which figure, in conjunction with the diagrams of Figs. 32 and 33, will also serve to indicate the manner in which the device controls the passage of light through an optical instrument.

As shown, the casing 103 of the device may be housed in the lens-mount 149 of a relatively large plate type camera intermediate the lenses 150 and 151, the position of the device as a whole being adjustable axially with respect to the lenses, as indicated by the broken line arrows. In order that the blade adjusting means of the outer unit will always be accessible without removing the device from the camera, the top of the lens-mount 149 is provided with an elongated opening 152 through which projects the adjusting knob 143.

In an attempt to illustrate the mode of operation of the device of the present invention, there have been added to Fig. 31 lines $R_1$, $R_2$, $R_3$, $R_4$ and $R_5$ which are intended to indicate the paths of travel of a plurality of groups of light rays all originating from the same point O on the object to be photographed and entering the camera in such directions that, were the control device removed, they would all be focused at a single point I on the photographic plate 153. The relative positions of these rays are also indicated in Figs. 32 and 33, which are intended to represent the light exit end of the dual unit device of Fig. 31 as it would appear when viewed from the point I on the plate 153. It should be expressly understood, however, that Figs. 31–33 are diagrammatic only, and that no attempt has been made to trace the exact paths of the various light rays, particularly as respects the bending thereof due to their passage through the lenses 150 and 151. It should also be noted that, while the device can be, and has actually been, used in conjunction with the lenses furnished as parts of conventional cameras, its ultimate utility will no doubt require lenses and other equipment of new and improved design which, however, form no part of the present invention.

As shown in the diagrams of Figs. 31–33, one group of rays $R_1$ leaves the rear face of the forward lens 150 at a point adjacent the periphery thereof along a path which lies within the confines of one of the light transmitting channels 121 formed by the blades 105 of the outer unit, and therefore passes freely through said channel and then through the rear lens 151 by which it is focused upon the point I of the plate 153. Similarly, the group of rays $R_2$, which leaves the lens 150 at a point closer to the center thereof than group $R_1$, but on the opposite side of said center, moves along a path which lies within the boundaries of one of the light transmitting channels 64 of the inner unit, and also ultimately contacts the plate at the point I. Still a third group of rays $R_3$ travels from a point adjacent the center of the lens 150 along a path of such direction as to permit the free passage thereof through the central well 68 of the inner unit, and is thus unobstructed in its passage toward the point I on the plate.

While these three groups of rays are thus permitted to pass freely through the dual unit device and to superpose their partial images upon the single point I of the plate, other rays originating from the same point O on the object, but leaving the rear face of the lens 150 at different portions of its area and along paths of different directions, are prevented from reaching the plate by impingement against the blades of the inner and outer units. For example, a group of rays such as that indicated at $R_4$, emanating from the lens 150 at a point adjacent its periphery, but diametrically opposite that at which group $R_1$ emerges, will find its path obstructed by one of the blades 105 of the outer unit located approximately diametrically opposite the blades defining the channel 121 through which the group $R_1$ is permitted to pass. Similarly, the group of rays indicated at $R_5$, leaving the lens 150 at a point diametrically opposite that at which group $R_2$ emanates, will be cut off by one of the blades 54 of the inner unit lying diametrically opposite the channel 64 through which group $R_2$ passes.

Although only five different groups of rays have been indicated in the drawings, and it has been assumed that all of these groups leave the rear face of lens 150 at points which lie along substantially the same diameter of the lens, it will be obvious, particularly from a consideration of Fig. 32, that certain other groups of rays in addition to groups $R_1$, $R_2$ and $R_3$, traveling along paths of generally the same directions from points adjacent those at which groups $R_1$, $R_2$ and $R_3$ emanate from the lens 150, will also reach the point I without obstruction, but that the vast majority of the rays leaving said lens will, like groups $R_4$ and $R_5$, be prevented from passing through the device by impingement against the inclined blades. Additional groups of rays will be cut off by the flange 114 at the forward end of the inner unit holder 112, while still others may be intercepted by the diaphragms 62 and 116, depending upon the adjustment thereof.

The light rays which reach any one point I on the plate are thus limited to those which pass through a relatively few of the light transmitting channels 64 and 121 of the inner and outer units, plus those which are received from the central portion of the lens 150 through the well 68 of the inner unit. The number of channels through which each such point on the plate may receive light, as well as the effective sizes of those channels, may be varied, however, by changing the angularities of the blades, the further that the blades are moved away from their neutral positions, the more restricted is the amount of light transmitted to any one point on the plate.

In this latter connection, it will be understood that the blade adjustment diagrammatically indicated in Figs. 31 and 32 is an intermediate position for the blades of each unit, with the blades of the outer unit inclined oppositely to those of the inner unit. One of the results of this reverse inclination of the blades of the two units is that the rays transmitted through the channels of the outer unit emanate from areas on the rear face of lens 150 which are disposed at a substantial distance, both circumferentially and radially, from those points at which emerge the rays which pass through the channels and the central well of the inner unit. By thus restricting the light which reaches each point of the plate to groups of rays which are separated from one another, there is produced an effect like that of viewing the same point on the object simultaneously from two different positions, thereby giving to the image a depth characteristic not attainable with ordinary photographic equipment. This same feature of the present invention will also find utility in optical instruments of other types, particularly those employed for the measurement of areas and distances.

The extent of the separation between the groups of rays just mentioned may be varied by changing the relative angularities of the blades of the inner and outer units. For example, Fig. 33 indicates the result of reversing the blades of the outer unit to positions opposite (with respect to neutral) to those which they occupy in Fig. 32. When thus adjusted, it will be seen that the group of rays indicated at $R_1$ is cut off, while the diametrically opposite group $R_4$ is permitted to pass through the device to the plate, thereby bringing the two groups of transmitted rays closer together than in the case of Fig. 32. Even with the adjustment indicated in Fig. 33, however, a definite separation between the groups of rays is provided by the intercepting action of the flange 114, supplemented, if desired, by the diaphragm 62 of the inner unit.

It will be apparent from the foregoing disclosure that the present invention provides means for controlling the passage or projection of light rays through optical instruments which are both structurally novel and also capable of functioning in such a manner as to produce new and hitherto unattainable results in the operation of such instruments. While, as a matter of structure, the invention is relatively simple, the fundamental principles underlying its functioning may not yet be fully understood; it is therefore not intended that the statements made herein with respect to these principles should be regarded as absolute in character. However, it has been established in actual practice that devices embodying the invention are capable of so controlling light as to produce novel results not attainable with optical instruments of conventional form, and that such results are due, at least in part, to the fact that these devices are capable of selectively limiting the light passing through an optical instrument to only a relatively small proportion of the rays which would otherwise be transmitted, and of exercising that selection according to the directions of the paths of travel of the rays and the portions of the field of the instrument from which those rays approach the controlling device.

Although a number of specifically different structural forms of the invention have been described and illustrated in the accompanying drawings, it will be obvious that the invention is not limited to the particular devices shown, but is capable of a variety of mechanical embodiments. For example, although the blades of the structures illustrated have been shown as adjustable, it will be possible in many instances, as in the case of fixed focus cameras, to form the units with blades which are permanently fixed at the desired angularities, thereby eliminating the extra expense involved in providing an adjustable mounting for the blades. As a further economy, units of such non-adjustable character might conveniently be made of molded plastic materials, instead of metal. Similarly, the various means which have been disclosed for varying the positions of the blades may be replaced by other equally suitable mechanical arrangements for performing the same functions. The blades themselves are likewise susceptible of variation in size, shape and arrangement, dependent upon the type of instrument in which they are to be embodied and the use for which they are intended. Still another modification that might be made is the substitution of stops of fixed size for the variable aperture diaphragms illustrated in the drawings.

Various other changes, which will now suggest themselves to those skilled in the art in the light of the foregoing disclosure, may be made in the form, details of construction and arrangement of the parts without departing from the inventive concept. Reference is therefore to be had to the appended claims for a definition of the limits of the invention.

What is claimed is:

1. A device for controlling the projection of light rays comprising a tubular barrel member through which the light rays are adapted to pass, and a pluarlity of blades of light obstructing material mounted within said barrel member in generally radial positions and having substantial extent lengthwise of said member so as to form a plurality of light transmitting channels therewithin, the planes of said blades being normally angularly off-set from the axis of said barrel member both lengthwise of the latter and radially so as to be non-intersecting with said axis.

2. A device for controlling the projection of light rays comprising a tubular barrel member through which the light rays are adapted to pass, and a plurality of blades of light obstructing material mounted within said barrel member in generally radial positions and having substantial extent lengthwise of said member so as to form a plurality of light transmitting channels therewithin, all of said blades being of less height than the radius of said barrel member so as to leave the central axial portion of the latter in open, unobstructed condition, and having their planes normally angularly off-set from the axis of said member.

3. A device for controlling the projection of light rays comprising a tubular barrel member through which the light rays are adapted to pass, a plurality of blades of light obstructing material mounted within said barrel member in generally radial positions and having substantial extent lengthwise of said member so as to form a plurality of light transmitting channels therewithin, means forming an operative connection between each of said blades and the wall of said barrel member such as to permit said blades to assume various positions relatively to said barrel member, including a neutral position wherein each blade is coplanar with the axis of said member, and means for turning said blades away from their neutral positions to positions wherein the planes thereof are angularly off-set from the axis of said barrel member both lengthwise and radially of the latter.

4. A device for controlling the projection of light rays comprising a tubular barrel member through which the light rays are adapted to pass, a plurality of blades of light obstructing material mounted within said barrel member in generally radial positions and having substantial extent lengthwise of said member so as to form a plurality of light transmitting channels therewithin, means forming an operative connection between each of said blades and the wall of said barrel member such as to permit said blades to assume various positions relatively to said barrel member, and means for turning each of said blades about two substantially perpendicular axes simultaneously, both of said axes lying in the plane of the blade with one of them extending substantially lengthwise thereof.

5. A device for controlling the projection of light rays comprising a tubular barrel member through which the light rays are adapted to pass, a set of blades of light obstructing material mounted within said barrel member in generally radial positions, having substantial extent lengthwise of said member and dividing at least the peripheral portion of the interior thereof into a group of light transmitting channels, a second tubular barrel member surrounding said first named member, and a second set of blades of light obstructing material mounted within said second barrel member in generally radial positions, having substantial extent lengthwise of said second barrel member and dividing the annular space between the two barrel members into a second group of light transmitting channels.

6. A light controlling device according to claim 5 including means for varying the positions of the blades of each of said two sets relatively to the barrel member in which said blades are mounted.

7. A light controlling device according to claim 5 wherein the planes of all of said blades normally lie in angularly off-set, non-intersecting positions relatively to the common axis of said two barrel members.

8. A light controlling device according to claim 5 including means for moving the blades of each set independtly of those of the other set to various positions wherein the planes of said blades are in angularly off-set, non-intersecting relation with respect to the common axis of said two barrel members.

9. A light controlling device according to claim 5 wherein one of said barrel members is adjustable relatively to the other in an axial direction.

10. A device for controlling the projection of light rays comprising a tubular barrel member through which the light rays are adapted to pass, a set of blades of light obstructing material mounted within said barrel member in generally radial positions, having substantial extent lengthwise of said member and dividing at least the peripheral portion of the interior thereof into a group of light transmitting channels, means forming an operative connection between a point on the base of each of said blades, intermediate the ends thereof, and the wall of said barrel member such as to permit said blades to assume various angularities relative to the axis of said barrel member, a blade adjusting element engaging another point on each of said blades spaced both axially and radially from said point of connection to the barrel member, and means for effecting relative rotational movement between said barrel member and said blade adjusting element and thereby turning each of said blades about two substantially perpendicular axes passing through its point of operative connection with the barrel member.

11. In an optical instrument of the character embodying a lens and a light sensitive element, a device for controlling the passage of light rays between said lens and light sensitive element comprising a tubular member interposed between the lens and the light sensitive element through which the light rays are adapted to pass, and means forming two groups of light transmitting channels within said tubular member of substantial extent lengthwise of said member, said means being so constructed and arranged that each of said channels transmits light from only a limited portion of the area of said lens to only a limited portion of the area of said light sensitive element, and that each portion of the area of said light sensitive element receives light rays which are transmitted through at least one channel in each of said two groups.

12. A device for controlling the projection of light rays comprising a tubular element through which the light rays are adapted to pass, and blade members of light obstructing material mounted within said tubular element in generally radial positions and forming therewithin a plurality of light transmitting channels, said blade members having substantial extent lengthwise of the tubular element but being of less height than the radius thereof so as to leave the central axial portion of said element in open, unobstructed condition, said blade members being arranged with their planes at such angles to the central axis of said element that each of the channels between said members transmits only those light rays which enter said tubular element at a restricted portion of the entrance thereof and along paths of definitely limited directions.

13. A light controlling device according to claim 12 wherein said blade members are so constructed and arranged that each of said light transmitting channels is normally angularly directed relatively to the central axis of said tubular element and transmits no light rays which intersect said axis.

14. A device for controlling the projection of light rays comprising a tubular element through which the light rays are adapted to pass, means forming an open central well within and of substantial extent axially of said tubular element through which light rays may pass freely without obstruction, and means forming an annular group of light transmitting channels surrounding said central well, said last named means being so constructed and arranged that each of said channels is also of substantial extent axially of said tubular element and transmits only those rays which enter the element along paths of definitely limited directions.

15. A device for controlling the projection of light rays comprising a tubular element through which the light rays are adapted to pass, means forming an open central well within and of substantial extent axially of said tubular element through which light rays may pass freely without obstruction, means forming an annular group of light transmitting channels surrounding said central well, said last named means being so constructed and arranged that each of said channels is also of substantial extent axially of said tubular element and transmits only those rays which enter the element along paths of definitely limited directions, and means for so adjusting said channel forming means as to vary the directional characteristics of said light transmitting channels.

16. A device for controlling the projection of light rays comprising a tubular element through which the light rays are adapted to pass, means forming an open central well within and of substantial extent axially of said tubular element through which light rays may pass freely without obstruction, means forming an annular group of light transmitting channels surrounding said central well, means forming a second annular group of light transmitting channels surrounding said first named group, both of said channel forming means being so constructed and arranged that each of said channels is also of substantial extent axially of said tubular element and transmits only those rays which enter the element along paths of definitely limited directions, and means for so adjusting said channel forming means as to vary the directional characteristics of said two groups of channels relatively to one another.

17. A device for controlling the projection of light rays comprising means forming two groups of light transmitting channels arranged about and having substantial extent along a common axis with one group surrounding the other, said means being so constructed and arranged that each of said channels is directed at an angle to said axis so as to transmit only those light rays which enter the device along paths of definitely limited directions and to prevent the transmission of all others, said means also being so constructed and arranged that each channel in each group transmits some rays which intersect with rays transmitted through one of the channels of the other group after passage through said channels.

18. A device for controlling the projection of light rays comprising means forming two groups of light transmitting channels arranged about and having substantial extent along a common axis with one group surrounding the other, said means being so constructed and arranged that each of said channels is directed at an angle to said axis so as to transmit only those light rays which enter the device along paths of definitely limited directions and to prevent the transmission of all others, and means for so adjusting said first named means as to vary the directional characteristics of the channels of at least one of said groups relatively to those of the other group.

WILLIAM B. POYNTER.